Feb. 9, 1932.    R. M. WASHBURN    1,844,707
FRUIT JUICE POWDER AND STABILIZATION THEREOF
Filed May 12, 1928
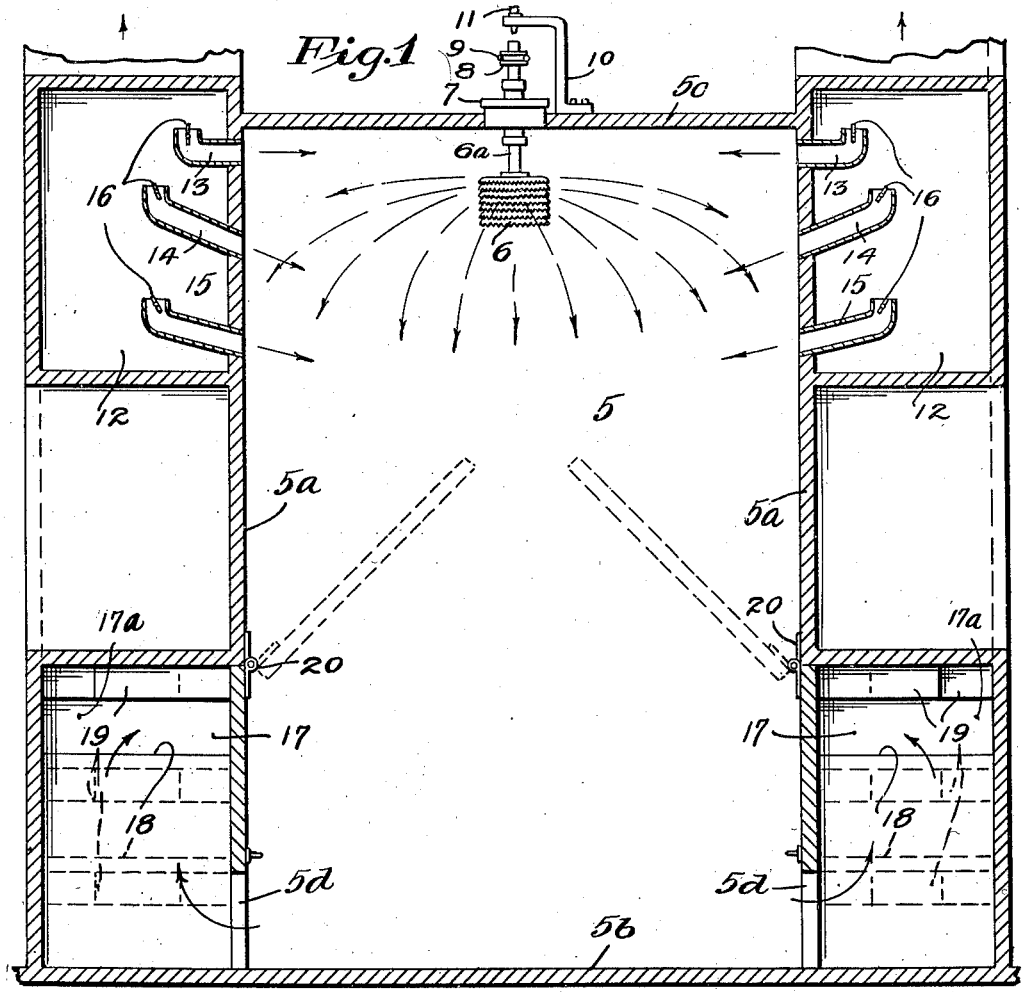
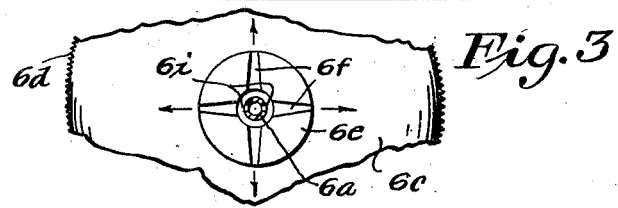
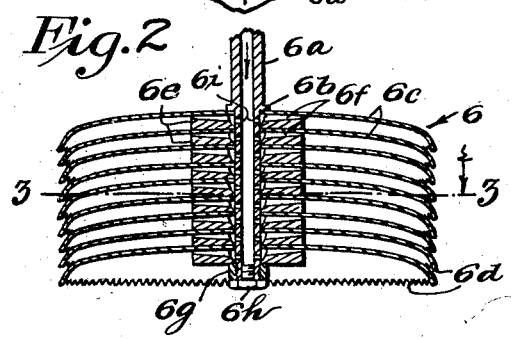
Inventor
Robert Mann Washburn
By his Attorneys Patented Feb. 9, 1932

1,844,707

UNITED STATES PATENT OFFICE

ROBERT M. WASHBURN, OF CHICAGO, ILLINOIS, ASSIGNOR, BY MESNE ASSIGNMENTS, TO ALBERT P. HUNT, OF CHICAGO, ILLINOIS

FRUIT JUICE POWDER AND STABILIZATION THEREOF

Application filed May 12, 1928. Serial No. 277,345.

This invention relates to a dried fruit powder and particularly to such a powder containing a stabilizing agent or substance, and to the process of making such a fruit powder. A great many attempts have been made to dehydrate the juice of citrous and other fruits, such as oranges, lemons, grapefruits, and grapes. The dehydration or extraction of the moisture from these juices is not particularly difficult, but the solids obtained by such dehydration are of such a nature chemically that these anhydrous solids become sticky and are very hygroscopic. This characteristic of the powder renders the dehydration impracticable by any of the ordinary methods. The more acid the fruit juice contains, the greater is this difficulty. Lemon juice and tomato juice are particularly difficult to dehydrate on this account.

All fruit juice solids are quite concentrated, and thus very strong in flavor, and a very small quantity of such solids is required to produce a satisfactory taste in any drink or food in which they may be used. Thus, the quantity of lemon juice powder necessary to flavor a glass of lemonade would be so small that it would be difficult to measure accurately from a quantity in bulk.

It is desirable, therefore, both from the stand point of overcoming the hygroscopicity, and owing to the fact that it is desirable to handle an appreciable quantity of the powder, to have some other substance mixed with the fruit juice before the same is dried. If a satisfactory substance could be found to overcome the hygroscopicity and also to furnish bulk to the substance, the result would be most desirable. The applicant in the present case has discovered most satisfactory and suitable stabilizing and expanding ingredients for this purpose.

It is an object of this invention, therefore, to provide a stabilized fruit juice powder containing a suitable substance which neutralizes the hygroscopicity and at the same time furnishes considerable bulk to the powder.

It is another object of the invention to provide a simple and efficient process of producing a stabilized fruit powder which is less hygroscopic and has considerable volume or bulk.

It is a further object of the invention to provide a dried fruit powder and process of making the same in which the pectin from citrous fruits is used as a stabilizing and expanding agent, particularly the pectin contained in the light pulpy portion of the citrous fruit.

It is also an object of the invention to provide a dried fruit powder and process of preparing the same, in which alginates, particularly sodium and ammonium alginate, are used as a stabilizer for neutralizing the hygroscopicity of the product and for increasing the volume thereof.

It is still another object of the invention to provide a dried fruit powder and process of making the same, in which the substance known as agar-agar is used as a stabilizer or neutralizer for the hygroscopicity and to add volume to and dilute the powder.

These and other objects and advantages of the invention will be fully set forth in the following description made in connection with the accompanying drawings, in which like reference characters refer to similar parts throughout the several views and in which:—

Fig. 1 is a central vertical section through one form of dehydrating apparatus suitable for carrying out the process;

Fig. 2 is a central vertical section through the distributor used; and

Fig. 3 is a horizontal section taken on line 3—3 of Fig. 2.

The applicant has discovered that the pectin obtained from the white pulpy portion of citrous and pome fruits is very efficient as a stabilizing agent for the fruit powder for the purpose of neutralizing the hygroscopicity thereof, and this substance is one factor or ingredient in the product and process of this invention. Another American marine industry has now developed a pure food product from marine plants, such as those of the family algae, which product is known under the general term of alginates or alginate material. This product is obtained in the form of a gluey like liquid of a clear white or amber color, similar to thin petroleum. This alginate material is in the form described substantially only one-tenth solid material, the other nine-tenths being principally water. This material has been found to be exceedingly difficult to dehydrate, but applicant has invented a process of drying the same as set forth in his co-pending application.

The applicant has also discovered that this alginate material is highly efficient for use as a stabilizing agent for the fruit powder to neutralize the hygroscopicity thereof and to furnish volume or bulk and act as a dilutent for the fruit powder. There are quite a number of these alginates and doubtless more will be developed. The one preferred by the applicant for use with the present invention is one known as sodium alginate. This material by acidulation with citric acid becomes suitable in every respect and serviceable as a stabilizing and expanding agent for the dried fruit powder. By applicant's process the material is dried into fine powder and both it and the powder from the fruit juices readily go into solution when mixed with water.

The applicant has also discovered that the marine plant substance known as agar-agar, which is also of jelly-like consistency, and like the alginates, constitutes a pure food, is very suitable for use as a stabilizer or neutralizing agent for the hygroscopicity of the fruit powder and at the same time forms a desirable substance as an expanding agent or bulk producer.

In carrying out the process, the stabilizing agents comprising either the sodium or ammonium alginate or the agar-agar, or a mixture of the two, are further mixed with a small quantity of pectin and a certain amount of sugar added, the mixture being heated so that the sugar is melted and thoroughly dissolved. If the mixture is highly sweetened, the amount to be weighed of the stabilizing agent used may be as low as 3%, and this will vary up to 10% of the total solids according to the amount of sugar used.

After the mixture is thus prepared, the fruit juices are added and it is disintegrated and dried by passage through heated air. While various forms of the apparatus might be used for this purpose, one form which is quite suitable is shown in the drawings.

Referring to the drawings, a drying cabinet is shown, comprising a chamber 5 having the vertical walls 5a, floor 5b and the top or ceiling 5c. At the central top portion of the cabinet is a distributing member designated generally as 6. This distributing member comprises a conduit or pipe 6a having a collar 6b extending thereabout against which is disposed the upper one of a plurality of concavoconvex disks 6c having their concave surfaces disposed downwardly and having their peripheries closed with a multiplicity of points or teeth 6d. The disks are spaced by smaller disks or washers 6e surrounding pipe 6a, said washers having radial grooves 6f in their top surfaces tapering outwardly in depth and width. The pipe 6a is provided with a plurality of holes 6i leading therefrom alined with the groove 6f in each of the disks or washers 6e. The lowermost washer 6e is held in place by a collar 6g threaded on the lower end of the pipe 6a and the lower end of said pipe is closed by a headed stud 6h threaded therein. The pipe 6a extends upwardly through a bearing 7 secured in the top 5c and has secured thereabove a driving pulley 8 over which runs a belt 9. A bracket 10 is mounted on top 5c, holding in position a stationary conduit 11 in axial alinement with pipe 6a. The material to be dried is delivered from pipe 11 and passes into the pipe 6a. An air supply chamber 12 surrounds the upper portion of cabinet 5 and opposite sides of the cabinet 5 have the inlet conduits 13, 14 and 15 leading thereinto, the other ends of these conduits being turned upwardly and opening into the chamber 12, the same being provided with adjustable valves or dampers 16. The cabinet 5 also has at opposite sides thereof in the same sides as the conduits 13, 14 and 15, recovery chambers 17, which are provided with spaced horizontal shelves 18 having spaced baffle plates 19 extending downwardly therefrom. Baffle plates 19 also extend down from the top of chambers 17. Openings 5d lead from the cabinet 5 into the corners respectively of the chambers 17 and the air passes in a circuitous path through chamber 17 and out at one upper corner 17a thereof, where it preferably is delivered to a further powder or dust separating device. The portion of the walls 5a forming the sides of the chamber 17 are hinged by the hinges 20 so that they can be swung inwardly as indicated in dotted lines, thus exposing the shelves 18 so that the latter may be cleaned.

The material prepared as above stated, comprising the fruit juices with the stabilizing agents and sugar mixed therein, which is in the form of a comparatively thin liquid, is delivered through conduit 11 into the pipe 6a. This material passes down and issues through the holes 6i into the grooves 6f. The head 6 is rotated at high speed and the material is thrown out through the grooves 6f onto the under surfaces of the disks 6c. The material is here distributed in a thin film and thrown outwardly at high velocity in finely disintegrated form from the points or teeth 6d, these teeth acting to finely divide and beat the material so that it is projected in a shower of very fine particles outwardly and downwardly. Hot air is delivered through the conduits 13, 14 and 15 and it will be seen that this air is directed in lines extending in different directions inwardly in the cabinet 5. The air from the conduits 13 is directed substantially horizontally and this air prevents any of the material passing upwardly or collecting on the top 5c of the cabinet. The air from conduits 14 is directed downwardly some distance below distributor 6 so that a zone is formed between the blasts from conduits 13 and 14, in which the shower of material is projected. The material falls and passes through the air delivered from conduits 14 and also traverses the air delivered through conduits 15. The dampers 16 can be regulated to give the desired effect on the entering air. The opposite inlets of air produce more or less whirling and eddying so that the material, by the time it reaches the bottom of the cabinet, is in the form of a dried powder and is deposited on the floor 5b. The air in the cabinet passes out through the openings 5d and any material carried thereby is precipitated on the floors and shelves of chamber 17, which material can be recovered by opening the door in the walls 5a. The solids in the fruit juices are thus recovered in the form of a dry powder and this is mixed with the dried stabilizing material which was projected in the cabinet therewith. The resulting mixture of the dry powder is substantially non-hygroscopic and can be packed in desired containers without difficulty. It is, of course, preferably packed and transported in sealed containers. The volume of the powder in comparison to the liquid is quite small and the same can be economically transported. The powder has a high degree of utility and is very convenient for flavoring water ices or sherbets, ice creams and various drinks and culinary products. The product has been made and the process amply demonstrated in actual practice and both found to be very successful.

It will, of course, be understood that the steps and sequence of steps of the process, as well as the proportions of the ingredients of the product can be varied, without departing from the scope of applicant's invention, which, generally stated, consists in the process and product capable of carrying out the above mentioned objects and such as defined in the appended claims.

What is claimed is:—

1. A dry fruit product readily soluble in water to produce a clear solution, comprising the solids of fruit juices and the solids of alginate material.

2. A dry fruit product readily soluble in water to produce a clear solution, comprising the solids of fruit juices and sodium alginate.

3. A dry, relatively bulky fruit product readily soluble in water with the production of a clear solution, comprising the solids of fruit juices, sodium alginate and agar agar.

4. A dry fruit product readily soluble in water to produce a clear solution, comprising the solids of fruit juices and from 3 to 10% sodium alginate.

In testimony whereof I affix my signature.

ROBERT M. WASHBURN.